United States Patent
Anstey et al.

(10) Patent No.: US 8,056,314 B1
(45) Date of Patent: Nov. 15, 2011

(54) WIDE CROP PICK-UP HAVING PRIMARY AND SECONDARY STRIPPER PLATES FOR CONVERGING AUGERS RESPECTIVELY MOUNTED TO MOVABLE CROP GUIDE PLATE PORTION AND TO FIXED WALLS BEHIND THE AUGERS

(75) Inventors: Henry D. Anstey, Ottumwa, IA (US); Daniel E. Derscheid, Hedrick, IA (US); Matthieu Dutertre, Gray (FR); Philippe Ostermann, Dijon (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/959,754

(22) Filed: Dec. 3, 2010

(51) Int. Cl.
*A01D 87/00* (2006.01)
(52) U.S. Cl. ........................................................ 56/364
(58) Field of Classification Search ............... 56/364, 56/341, 17.3, 17.4, 62, 119, 505, DIG. 20, 56/DIG. 21; 100/88
See application file for complete search history.

(56) References Cited

U.S. PATENT DOCUMENTS

| | | | | |
|---|---|---|---|---|
| 2,421,037 | A * | 5/1947 | Ronning | 198/670 |
| 3,118,265 | A * | 1/1964 | Shaver | 56/14.4 |
| 3,132,459 | A * | 5/1964 | Grillot | 56/341 |
| 3,525,204 | A * | 8/1970 | Dovichak | 56/364 |
| 4,436,027 | A * | 3/1984 | Freimuth et al. | 100/88 |
| 5,557,912 | A * | 9/1996 | Voss et al. | 56/130 |
| 5,819,517 | A | 10/1998 | Amanatidis et al. | |
| 5,848,523 | A * | 12/1998 | Engel et al. | 56/341 |
| 6,370,856 | B1 * | 4/2002 | Engel | 56/341 |
| 6,679,042 | B1 * | 1/2004 | Schrag et al. | 56/341 |
| 7,124,568 | B2 * | 10/2006 | Hotaling | 56/341 |
| 7,252,587 | B2 | 8/2007 | Viaud | |

FOREIGN PATENT DOCUMENTS

EP 0815720 7/1998

\* cited by examiner

*Primary Examiner* — Thomas Will
*Assistant Examiner* — Mai Nguyen (57) ABSTRACT

A wide pick-up for a baler includes a crop feed rotor and auger arrangement located at an elevated position rearward of a tined pick-up reel arrangement. Positioned for receiving crop delivered by the reel arrangement, and extending beneath the crop feed rotor and auger arrangement is a crop guide plate arrangement including a central movable crop guide plate portion mounted to be moved vertically between a raised feed position, wherein it is relatively close to a circular path traced by the outer peripheries of the crop feed rotor and the converging augers, and a lowered, crop unplugging position, wherein it is spaced to create a gap between the crop guide plate portion and the crop feed rotor and auger arrangement. Right and left, primary crop stripper plates are respectively mounted to right and left front end regions of the moveable crop feed plate portion, with the primary stripper plates each having an edge located close to the associated auger for preventing crop from being wrapped about the augers when the movable crop guide plate portion is in its normal raised operating position. Right and left secondary crop stripper plates are respectively mounted to right and left fixed walls extending upwardly about the augers from right and left fixed guide plate portions, these secondary stripper plates remaining in place to strip crop from the augers when the central movable crop guide plate portion is lowered.

5 Claims, 6 Drawing Sheets

WIDE CROP PICK-UP HAVING PRIMARY AND SECONDARY STRIPPER PLATES FOR CONVERGING AUGERS RESPECTIVELY MOUNTED TO MOVABLE CROP GUIDE PLATE PORTION AND TO FIXED WALLS BEHIND THE AUGERS

FIELD OF THE INVENTION

The present invention relates to wide crop pick-ups, and more specifically relates to such pick-ups which include a crop guide plate arrangement and converging augers with stripper plates for such augers.

BACKGROUND OF THE INVENTION

Agricultural machines such as balers, for example, are sometimes equipped with a crop pick-up that is wider than the baling chamber or other mobile container to which the picked up crop is being conveyed. EP 08 15 720 discloses a large round baler having such a pick-up and it is equipped with a rotary, tined pick-up reel having a width greater than that of the baling chamber and operable for elevating a windrow of crop material from the ground and delivering the crop material rearward onto a crop guide plate arrangement which extends to the inlet of the baling chamber. To aid this rearward movement of the crop material, right and left converging augers are provided at opposite ends of a centrally located tined rotor. The guide plate arrangement includes a region located closely adjacent the circular path traced by the peripheries of the augers and rotor. In order to provide relief for avoiding plugging, designers have mounted a central portion of the crop guide plate arrangement for moving downwardly, against a spring force, away from the tined rotor. The aforementioned EP publication has a floor constructed in this manner. Other baler pick-up crop guide plate arrangements that are movable relative to a tined rotor for avoiding plugging are disclosed in U.S. Pat. Nos. 5,819,517 and 7,252,587, noting that neither of these discloses a wide pick-up having converging augers.

A problem associated with the device of the EP publication is that with such devices it is known to provide right and left stripper plates on the front of the crop guide plate arrangement at respective locations in front of the right and left converging augers. When loads acting on the guide plate arrangement cause it to move downwardly from its normal working position in order to avoid a plugging situation, these stripper plates move with the guide plate arrangement and lose their effectiveness in preventing crop material from wrapping around the augers.

The problem to be solved by the present invention is that of providing a wide pick-up with a so-called drop crop guide plate arrangement while retaining an auger stripping function.

SUMMARY OF THE INVENTION

According to the present invention, there is provided a novel wide crop pick-up which effectively delivers crop to an inlet of a container to which crop material is being fed by the pick-up while operating to avoid, or at least significantly reduce, plugging.

An object of the invention is to provide a wide crop pick-up with a crop guide plate assembly having a major guide plate portion extending substantially the full width of the pick-up and being mounted for controlled vertical movement relative to converging augers and a crop feed rotor, and to equip the pick-up with a stripper plate arrangement that is effective to strip crop from the augers even when the major guide plate portion is moved downwardly from a normal working position so as to avoid or reduce plugging.

The foregoing object is achieved by providing a set of right and left primary auger stripper plates respectively mounted to a front region of the crop guide plate assembly and having respective edges located adjacent the converging augers, and by providing a set of right and left secondary auger stripper plates respectively mounted on fixed right and left auger back walls, the stripper plates having respective edges disposed adjacent the auger peripheries.

These and other objects will be apparent from a reading of the ensuing description together with the appended drawings.

DESCRIPTION OF THE PREFERRED EMBODIMENT

Figure 1:
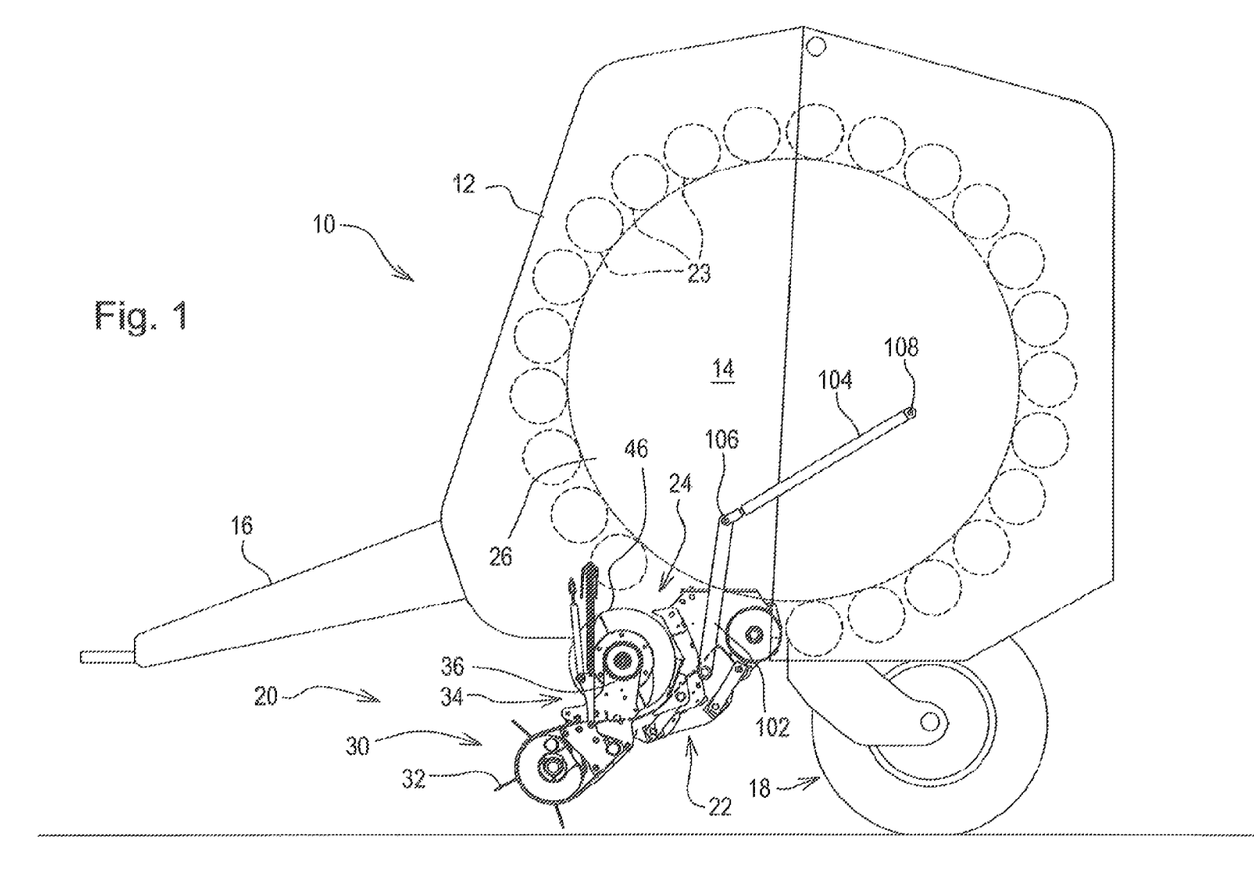
FIG. 1 is a schematic left side view of a towed, large round baler shown in a normal baling mode wherein a control linkage arrangement for a movable major center portion of the crop guide plate assembly is shown in a raised condition holding the center portion of the crop guide plate assembly in a fully elevated crop feeding position defining a normal operating clearance between the movable guide plate portion and the peripheries of the crop feed rotor and auger arrangement.

Referring now to FIG. 1, there is shown a baler 10 including a baler housing 12 defining opposite sides of a baling chamber 14 and to which is attached a drawbar 16, a pair of ground wheels 18 (only one shown), and a crop pick-up arrangement 20 including a crop conveyor arrangement 22 constructed in accordance with the present invention.

In this embodiment, the baler 10 is configured as a large round baler, with the baling chamber 14 being a fixed size defined by a plurality of rollers 23 extending transversely between opposite side walls of the housing 12 and arranged in a circular pattern leaving a gap at a lower front location thereof so as to define a crop inlet 24 for receiving crop, for example, hay, straw or silage, which is rolled by the action of the rollers 23 into a large cylindrical bale 26. Alternatively, the baler 10 could have a variable or expansible baling chamber, or the baler could be configured as a baler for producing parallelepiped bales. In the same sense, the configuration as a baler is not necessarily significant since the crop pick-up arrangement 20 can also be applied to a self-loading forage box, or the like Referring now also to FIGS. 2-4, it can be seen that the pick-up arrangement 20 includes a frame 28 to which is mounted a tined pick-up reel 30 for being driven in an overshot manner so as to pick-up windrowed crop lying on the ground. The pick-up reel 30 is significantly wider than the width of the baling chamber 14 and includes a center shaft 31 carrying a plurality of tooth bars (not shown) to each of which a plurality of tines 32 are secured, in a manner well known in the art. Associated with the pick-up reel 30 are a plurality of transversely spaced U-shaped tine guide bands 33, with upper rear portions of the bands 33 acting to strip crop from the tines 32 as the tines rotate downwardly through slots defined between adjacent bands when windrowed crop is being lifted from the ground and conveyed rearward to the conveyor arrangement 22 by the pick-up reel 30. Other known pick-up devices such as conveyor belts with tines, or retractable finger drums may be used, for example, without in any way affecting operation of the conveyor arrangement 22 of the present invention.

The conveyor arrangement 22 includes a crop feed rotor and auger arrangement 34 elevated above, and to the rear of, the pick-up reel 30 at a location approximately halfway between the pick-up reel 30 and the baling chamber inlet 24. The rotor and auger arrangement 34 includes a cylindrical, center support tube 36, with opposite ends of the support tube 36 being fixed to axially extending stub shafts 37 which are respectively received for rotation within bearing assemblies 38 mounted to right and left side wall structures of the baler housing 12, with the bearing assembly 38 associated with the right side wall structure being best shown in FIG. 6. As can best be seen in FIG. 4, the crop feed rotor and auger arrangement 34 includes a plurality of flat crop conveying plates 40 disposed perpendicular to a transverse horizontal rotation axis of the center support tube 36, with the plates 40 each being shaped to define three, radially projecting teeth 42 spaced angularly 120° from each other, and with the plates 40 being equally spaced from each other axially along, and being fixed to, a central zone of the support tube 36 having a width approximately equal to that of the baling chamber 14.

Right and left end regions of the support tube 36 are respectively provided with right and left auger flights 44 and 46, thereby forming right and left crop converging augers 48 and 50. During rotation, the peripheries of the teeth 42 and the auger flights 44 and 46 of the crop feed rotor and auger arrangement 34 trace out a cylindrical path 52 as the auger and rotor arrangement 34 is driven in an undershot manner (counterclockwise as viewed in FIGS. 1-3 and 5.

The conveyor arrangement 22 further includes a sheet metal crop guide plate arrangement 54 which extends rearward from a location spaced slightly rearward of, and below upper rear ends of the U-shaped tine guide bands 33 to a location adjacent the roller 23 which defines a lower boundary of the baling chamber inlet 24. The guide plate arrangement 54 includes fixed right and left guide plate portions 58 (FIGS. 4 and 6) and 60 (FIG. 3), respectively, and a movable center guide plate portion 62. The right guide plate portion 58 has a right end fixed to the right side wall 28 and has a left end fixed to a top edge of a vertical, fore-and-aft extending stiffening plate 64 (FIG. 6) which is spaced from the side wall 28 a distance approximately equal to ⅓ the length of the right auger 48. The right fixed guide plate portion 58 has a transverse rear end fixed to a right front region of a transverse bottom end of an angled upright wall 66 that located behind the right auger flight 44 and is fixed to, and extends transversely from the side wall 28 by a distance approximately equal to the length of the auger flight 44, the upright wall 66 cooperating with the guide plate arrangement 54 to guide crop to the center of the pick-up. Thus, the fixed right guide plate portion 58 and right upright wall 66 form a single unit. In a similar fashion, the left fixed guide plate portion 60 has a left side joined to a left side wall (not shown) and a rear side joined to a transverse lower end of an upright wall 68 located behind the left auger flight 46 and extending transversely inwardly from the left side wall by a distance approximately equal to the length of the left auger flight 46.

A middle region between front and rear ends of the guide plate arrangement 54 and of the upright walls 66 and 68 are formed to conform approximately to a radius slightly greater than that of the cylindrical path 52 so as to define a predetermined, minimum working clearance gap between the path 52 and the guide plate arrangement 54. In order to prevent overloads caused by crop or obstacles becoming wedged in the gap between the guide plate arrangement 54 and the rotor teeth 42 and/or the auger flights 44 and 46, the center guide plate portion 62 of the guide plate arrangement 54 is mounted for movement between a normal raised working position, as shown in FIGS. 1-4, and a fully lowered crop-relief position, as shown in FIGS. 5 and 6, for permitting slugs of crop to pass through a widened gap between the movable center guide plate portion 62 and the rotor teeth 42 and/or the auger flights 44 and 46.

Figure 2:
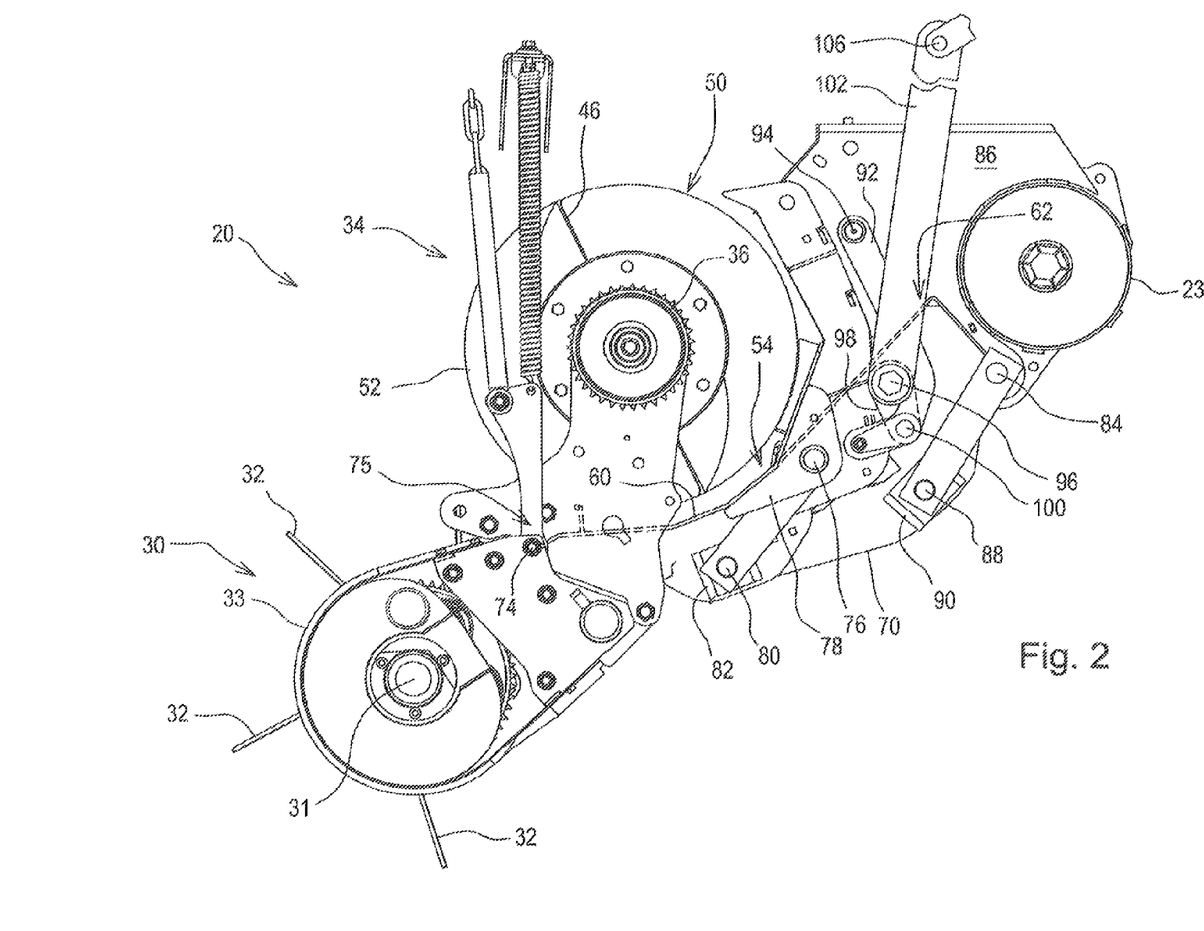
FIG. 2 is an enlarged left side view of the crop pick-up arrangement shown in FIG. 1 and showing primary and secondary stripper plate arrangements for preventing crop from wrapping about the crop converging augers.
Figure 3:
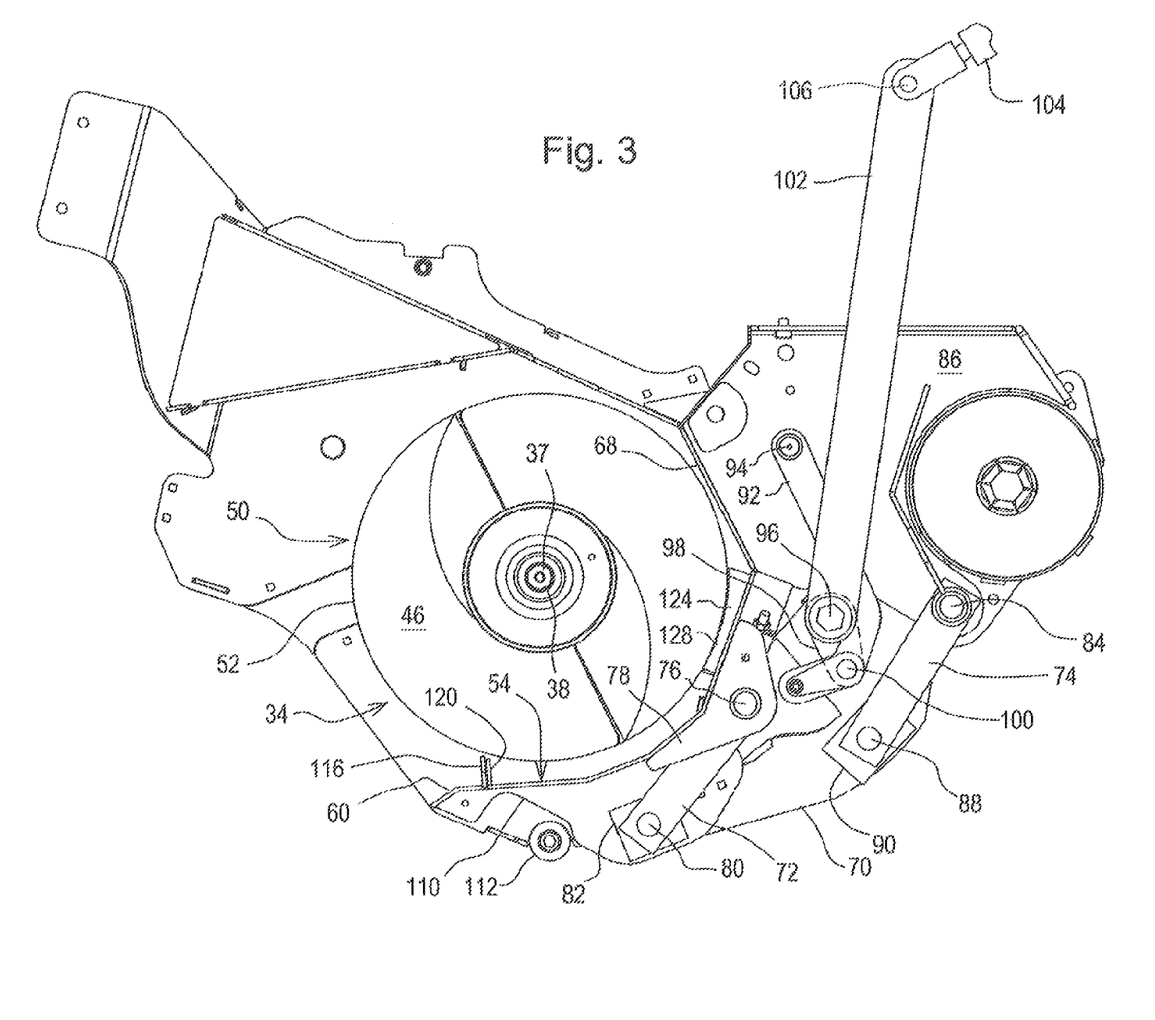
FIG. 3 is a left side view of the crop conveyor arrangement shown in FIG. 2, but omitting the frame structure supporting the left end of the crop feed rotor and auger arrangement and supporting the left fixed end portion of the crop guide plate arrangement.
Figure 4:
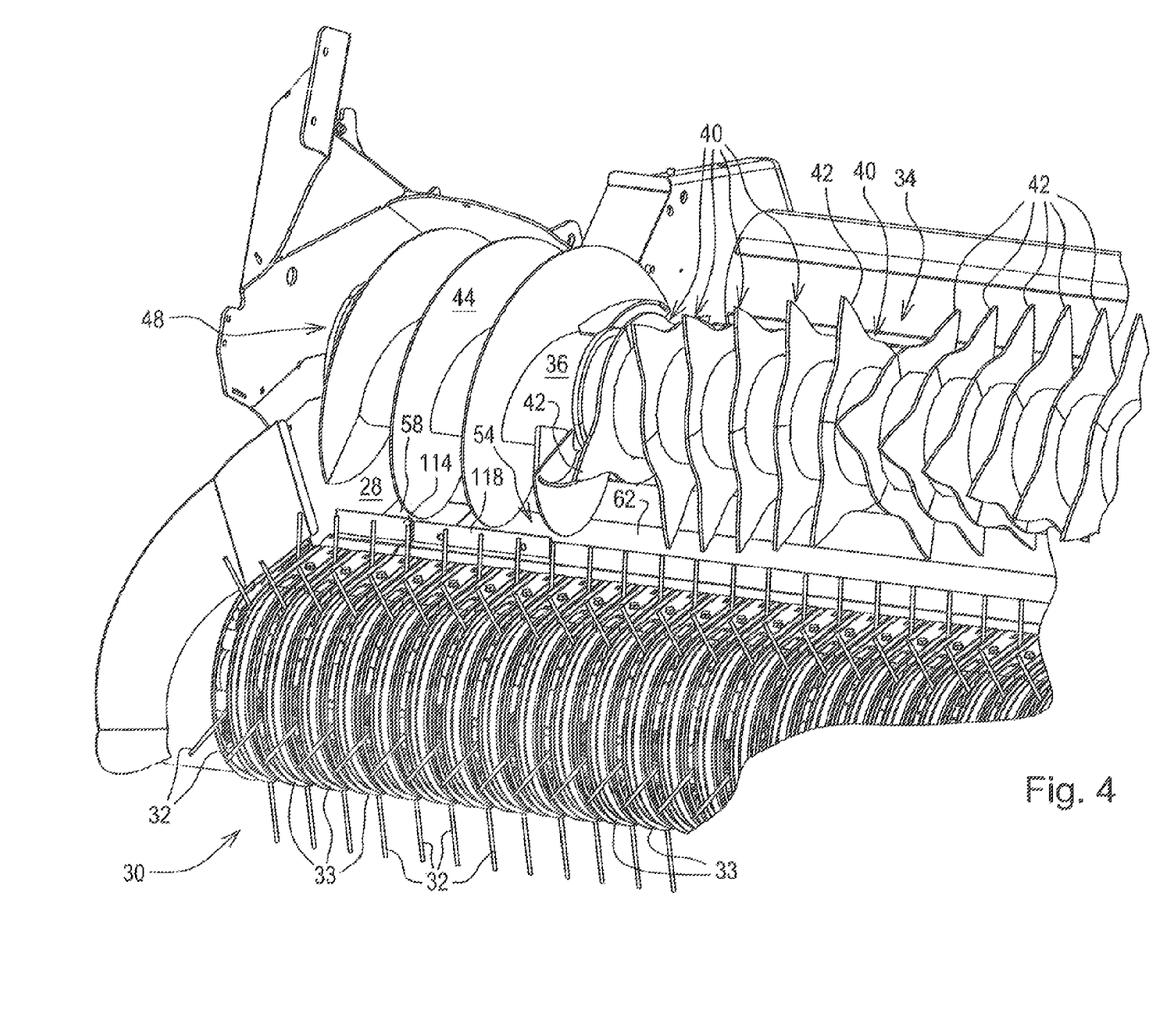
FIG. 4 is an enlarged left front perspective view of a right end region of the crop pick-up arrangement shown in FIG. 2 and showing the right fixed and right movable portions of the crop stripper plate arrangement, but omitting the structure for suspending the right side of the pick-up arrangement.

Specifically, with reference to FIGS. 2 and 3, it can be seen that a top edge of a vertical, fore-and-aft extending, left mounting plate 70 is fixed to an underside of a left side region of the movable center guide plate portion 62. A similar right mounting plate (not shown) is provided beneath a right side region of the center guide plate portion 62. Associated with each of the mounting plates is are links of a parallel linkage provided for controlling movement of the guide plate portion 62 between the normal raised operating position and the fully lowered, crop-relief position, with only the links associated with the mounting plate 70 being illustrated and described, it to be understood that similar links are associated with the right mounting plate. Thus, associated with the left mounting plate 70 are front and rear, parallel links 72 and 74, respectively. The front link 72 includes an upper end pivotally mounted, as at pin 76, to a bracket 78 fixed to a backside location of the left upright wall 68, and having a lower end pivotally attached, as at a pin 80, to a front bracket 82 fixed to a left surface location of the mounting plate 70. The rear link 74 has an upper end pivotally coupled, as at pin 84, to a vertical plate 86 forming part of the baler housing 12, and has a lower end pivotally attached, as at a pin 88, to a second bracket 90 fixed to the outer surface of the mounting plate 70. A J-shaped radius arm 92 has an upper end pivotally attached, as at a pin 94, to the vertical plate 86 at a location spaced vertically above and between the parallel, front and rear links 72 and 74. A control shaft 96 extends transversely through, and is mounted for rotation in, the right mounting plate 70 and in the corresponding left mounting plate (not shown) at a level approximating that at which the hook of the J-shape radius arm 92 is joined to the stem of the J. The control shaft 96 is hexagonal in cross section and a complimentary-shaped hexagonal opening in one end of a crank arm 98 is received on the shaft 96, with a second end of the arm 98 being pivotally connected, as at a pin 100, to a mid-location along the hook of the J of the radius arm 92, the hook extending beneath the shaft 96. A control arm 102 has a lower end provided with hexagonal opening snugly received on the control shaft 96, and an extensible and retractable, hydraulic control actuator 104 has a rod end pivotally attached, as at a pin 106, to an upper end of the control arm 102, with a cylinder end of the actuator being pivotally attached, as at a pin 108, to the baler housing 12.

Figure 5:
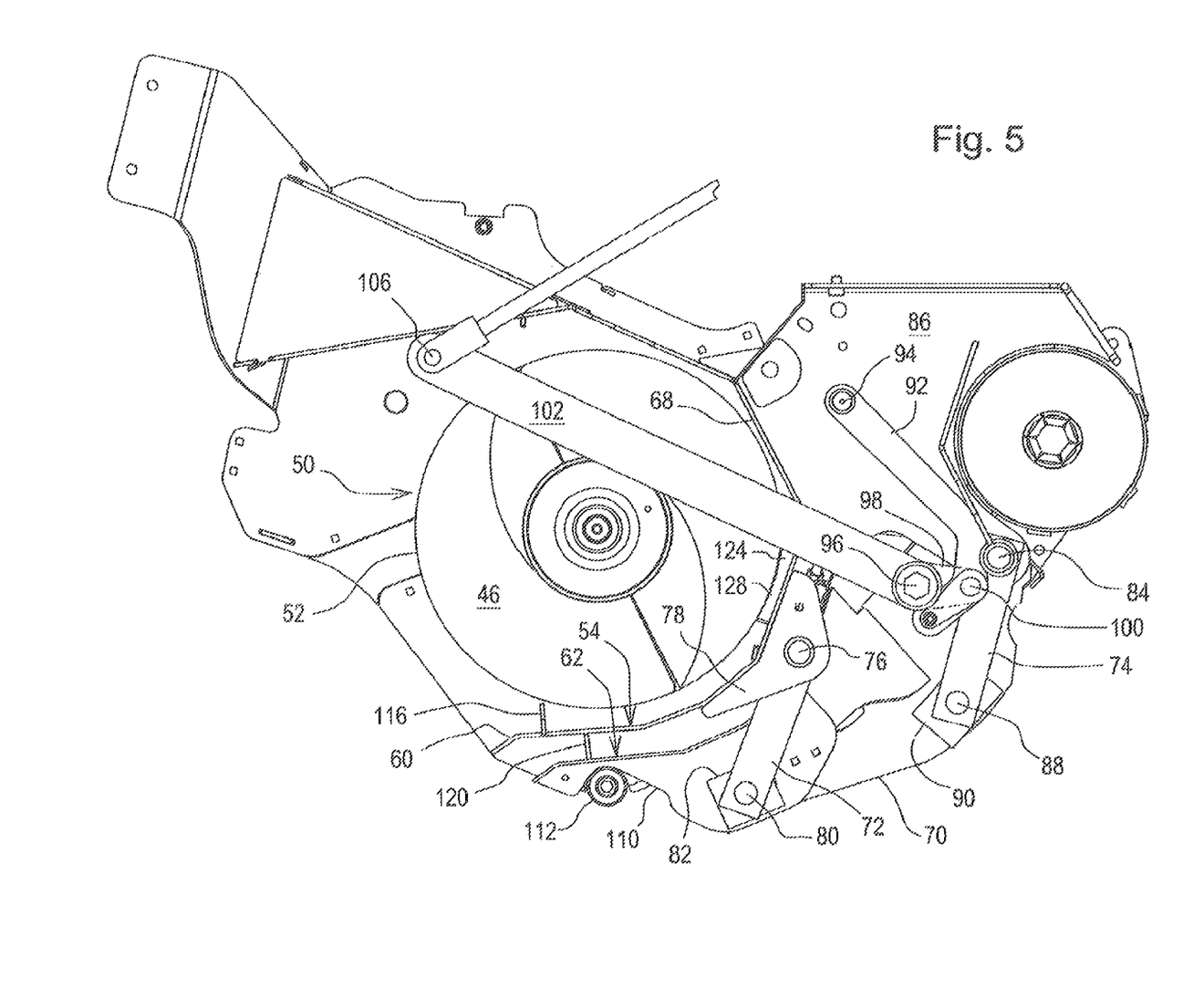
FIG. 5 is a left side view like FIG. 3, but showing the guide plate control linkage moved to a fully lowered, crop-relieving position wherein the movable center section of the crop guide plate arrangement is moved to a fully lowered, crop-relieving position, with the movable portions of the primary stripper plate arrangement being shown fully lowered so as to create a desired major clearance gap between the converging augers and the movable stripper plate portions.
Figure 6:
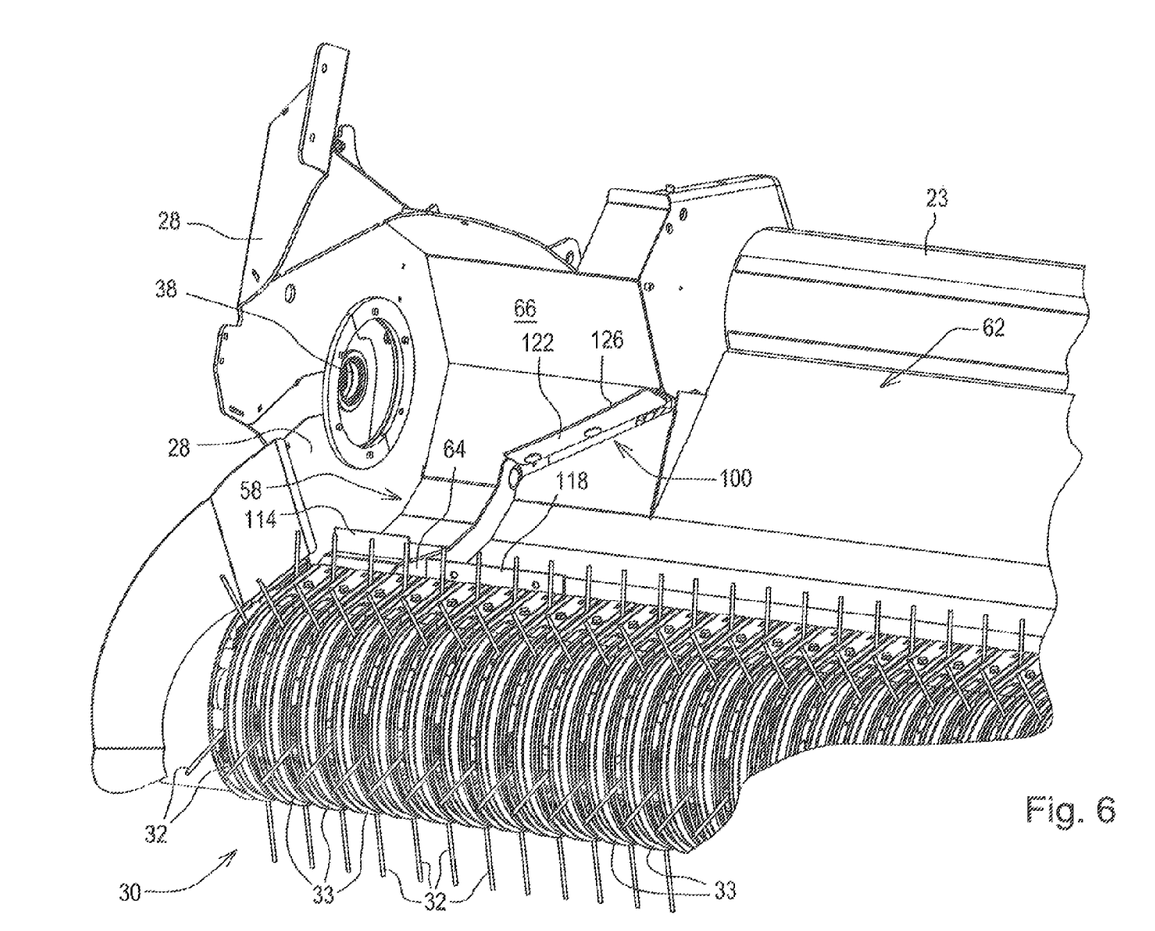
FIG. 6 is a view like FIG. 4, but showing the right auger removed thereby revealing the right secondary auger stripper plate of the secondary stripper plate arrangement.

Thus, it will be appreciated that when the hydraulic actuator 104 is fully retracted, as shown in FIGS. 1-3, the control arm 102 is in a near upright position with the crank arm 98 working against the radius arm 92 so as to hold the center guide plate portion 62 in the fully raised operating position; and when the hydraulic actuator 104 is extended, as shown in FIG. 5, the control arm 102 is pivoted forwardly such that the crank arm 98 works against the radius arm 92 so as to cause the center guide plate portion 62 to be guided away from the path 52 to the fully lowered crop-relief position by the parallel links 72 and 74 as they respectively pivot to the rear about the pins 76 and 84. It is noted that a front region of a notch 110 provided in a lower front location of the mounting plate 70 comes into engagement with a fixed stop 112 when the guide plate portion 62 reaches its fully lowered crop-relief position. A control circuit similar to that disclosed in U.S. Pat. No. 7,252,587 could be provided to permit the automatic extension of the actuator 104 in response to a predetermined force being exerted on the movable crop guide plate portion 62 indicative of crop becoming plugged in the gap between the crop feed and auger rotor assembly 34 and the guide plate portion 62. The disclosure of this patent is incorporated herein in its entirety for the teaching of this automatic control. Of course other ways of controlling the actuator 104 could be provided including that of provided a torque sensor on the crop feed rotor and auger arrangement 34 which would likewise give an indication of an impending plugging situation with the torque sensor acting to send a signal to an electronic control unit which would act to provide a control signal to an electrically responsive valve for effecting a proportional extension of the actuator 104 until the impending crop plugging condition is relieved. At the same time, a warning signal could be sent to the operator so that steps may be taken to stop the baler towing vehicle so that additional crop is not taken up until the impending plugging condition is relieved. Also, the operator may manually operate a control valve for the actuator 104 to cause it to extend so as to relieve a crop plugging condition.

Crop is prevented from wrapping about the flights 44 and 46, respectively, of the augers 48 and 50 by right and left stripper plate arrangements. Specifically, the right and left stripper plate arrangements respectively comprise right and left fixed primary stripper plates 114 (FIGS. 4 and 6) and 116 (FIG. 5) respectively mounted to forward regions the right and left fixed guide plate portions 58 and 60, right and left movable primary stripper plates 118 (FIGS. 4 and 6) and 120 (FIGS. 3 and 5) respectively mounted to forward regions of the movable center crop guide portion 62, and right and left fixed secondary crop stripper plates 122 and 124, respectively, fixed to the upright walls 66 and 68. The primary crop stripper plates 114, 116, 118 and 120 are all disposed parallel to an axis of rotation of the crop feed rotor and auger arrangement 34, with the fixed stripper plates 114 and 116 being substantially perpendicular to the fixed guide plate portions 58 and 60, and with the movable stripper plates 118 and 120 being substantially perpendicular to the movable center guide plate portion 62. As can best be determined from FIG. 3, the fixed stripper plates 114 and 116 are transversely aligned with each other and are offset slightly to the front of the movable stripper plates 118 and 120, which are also in transverse alignment with each other. The right secondary crop stripper plate 122 is fixed to a lower region of the right upright wall 66 and is disposed such that it extends upwardly and inwardly from a location in approximate fore-and-aft alignment with the right side of the movable center crop guide plate portion 62. The right secondary crop stripper plate 122 is disposed perpendicular to the upright wall 68 and has an upper edge 126 curved so as to maintain a close spaced relationship with the cylindrical rotation path of the outer extreme of the right auger flight 44, with the inwardly and upwardly inclined disposition of the plate causing crop to be stripped from the augers and guided toward the center of the pick-up arrangement 20. The left secondary crop stripper plate 124 is mounted to the left upright wall 68 so as to be a mirror image of the right secondary crop stripper plate 122, with the stripper plate 124 having an upper curved edge 128 disposed in close proximity to the path of rotation 52 of the left auger flight 46.

During normal operation, with the hydraulic control actuator 104 fully retracted such that the left set of parallel links 72 and 74, and the corresponding right set of parallel links (not shown) hold the movable center crop guide plate portion in its raised normal operating position, the tined pick-up reel 30 will elevate windrowed crop from the ground and deliver it to the crop feed rotor and auger arrangement 34, which is driven in an undershot manner such that the right and left converging augers 48 and 50 will engage crop delivered them and move it inwardly, with the right primary crop stripper plates 114 and 118, and the left primary crop stripper plates 226 and 120 acting to prevent crop from wrapping around the augers 48 and 50.

In the event that an impending plugging condition arises, this condition will somehow be sensed and a signal sent for either automatically effecting a control response causing the actuator 104 to extend, or for sending a warning signal to the operator who effects operation to cause the actuator 104 to extend, this extension of the actuator 104 in either case resulting in the movable crop guide plate portion 62 to be moved downwardly so as to increase the gap between the guide plate portion 62 and the feed rotor plates 40 and auger flights 44 and 46 and relieve the crop plugging condition. However, the lowering of the crop guide plate portion 62 also results in the primary stripper plates 128 and 124 being lowered resulting in the effectiveness of these stripper plates to strip crop from the auger flights 44 and 46 being diminished. But stripping of crop from the auger flights 44 and 46 is still effectively accomplished by the right and left primary stripper plates 114 and 116, and by the right and left secondary stripper plates 122 and 124, which are respectively located so as to strip crop from the same axial lengths of the auger flights 44 and 46 from which the movable primary stripper plates 118 and 120 strip crop when the movable crop guide plate portion 62 is in its normal raised operating position.

The present invention has been described in what is considered to represent its preferred embodiment. However, it should be apparent that various modifications can be made without departing from the scope of the invention as defined in the accompanying claims.

The invention claimed is:

1. In a wide crop pick-up of a crop harvesting implement including a transverse pick-up reel located at a front of said pick-up, a crop feed rotor and auger arrangement located at an elevated position behind said reel and having a width equal to that of said reel and including right and left crop converging augers respectively located at opposite ends of a crop feed rotor for moving crop inwardly to said crop feed rotor, a crop guide plate arrangement extending rearward from said reel beneath said crop feed rotor and auger arrangement, and said crop guide plate arrangement including a movable central crop guide plate portion extending at least beneath said feed rotor and being mounted for movement between a raised position located closely adjacent a periphery of said crop feed rotor and defining a normal working clearance between said rotor and said central region of said crop guide plate arrangement, and a lowered position increasing said working clearance for reducing working loads and/or relieving a plugged condition, the improvement comprising:

said central portion of said crop guide plate arrangement having right and left end regions respectively extending beneath at least a major length of said right and left converging augers;

right and left primary stripper plates respectively mounted to said right and left end regions of said movable central crop guide plate portion and having edges disposed in close proximity to said peripheries of said augers when said central crop guide plate portion is in said raised position;

right and left back walls respectively extending upwardly from said right and left regions of said movable crop guide plate portion and respectively being closely adjacent said major length of said right and left augers; and right and left secondary stripper plates being respectively fixed to said right and left back walls and having edges respectively positioned adjacent the peripheries of said right and left augers so as to remain positioned for effectively stripping crop from said augers when said edges of said right and left primary stripper plates are moved away from said peripheries of said augers when said right and left regions of said central guide plate portion are lowered together with said central guide plate portion.

2. The wide crop pick-up, as defined in claim 1, wherein said right and left primary stripper plates are each mounted in parallel relationship to an axis of rotation of said crop feed rotor and auger arrangement.

3. The wide crop pick-up, as defined in claim 1, wherein said right and left secondary stripper plates are respectively mounted so as to be inclined upwardly and inwardly on said right and left back walls.

4. In a crop harvesting machine having a crop pick-up including a crop guide plate arrangement underlying a crop feed rotor and auger arrangement having a horizontal transverse rotation axis and including a central region provided with a plurality of crop-engaging teeth and including right and left end regions defined by right and left converging augers which trace a cylindrical path about said axis, said guide plate arrangement being curved about a lower region of said path and including a movable central crop guide plate portion mounted for vertical movement between a raised normal operating position defining a first gap between the guide plate arrangement and the cylindrical path, and at least one lowered plug relief position defining a second gap between the guiding surface and said cylindrical path which is larger than said first gap, the improvement, comprising: said guide plate arrangement extending beneath respective lower regions of said right and left converging augers; and right and left stripper plates respectively being mounted to right and left front regions of said central guide plate portion at locations adjacent said right and left augers with edges of said stripper plates being in close proximity to peripheries of said augers.

5. The crop harvesting machine, as defined in claim 4, and further including right and left upright walls respectively located behind said right and left augers and extending upwardly from right and left rear edge portions of said guide plate arrangement; and right and left secondary stripper plates being respectively mounted to said right and left upright walls and having respective edges located in close proximity to the peripheries of said right and left converging augers.

* * * * *